Aug. 12, 1952     C. K. EDWARDS     2,606,674
REFUSE VEHICLE
Filed Aug. 17, 1950     3 Sheets-Sheet 2
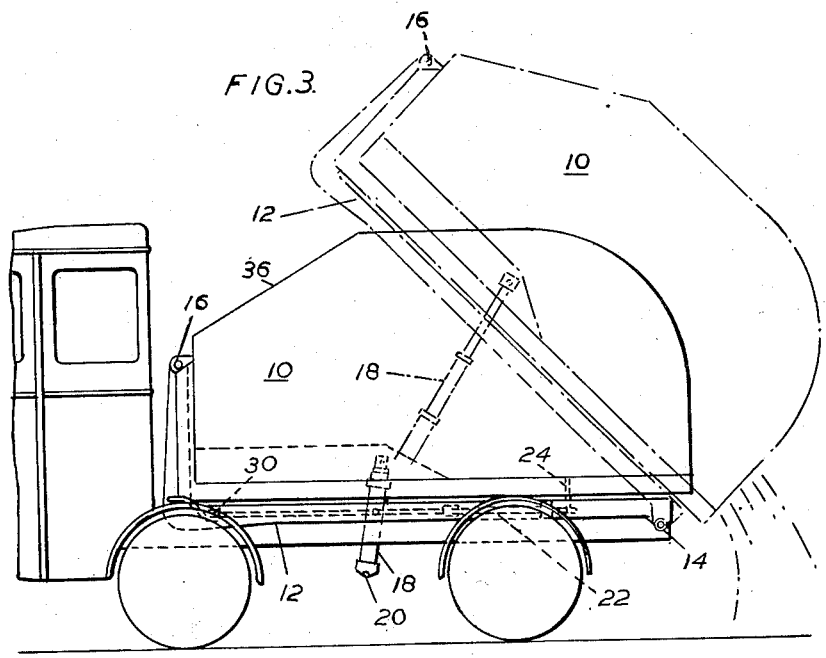
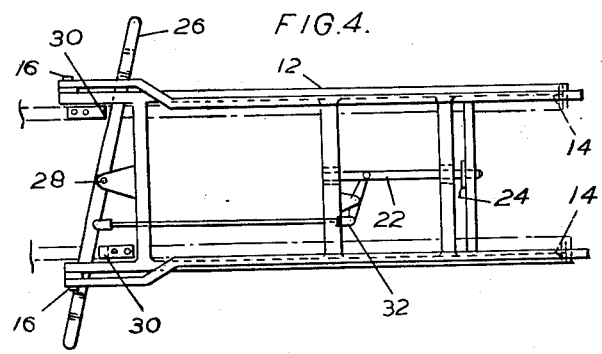
Inventor
Charles K. Edwards
By
Attorney

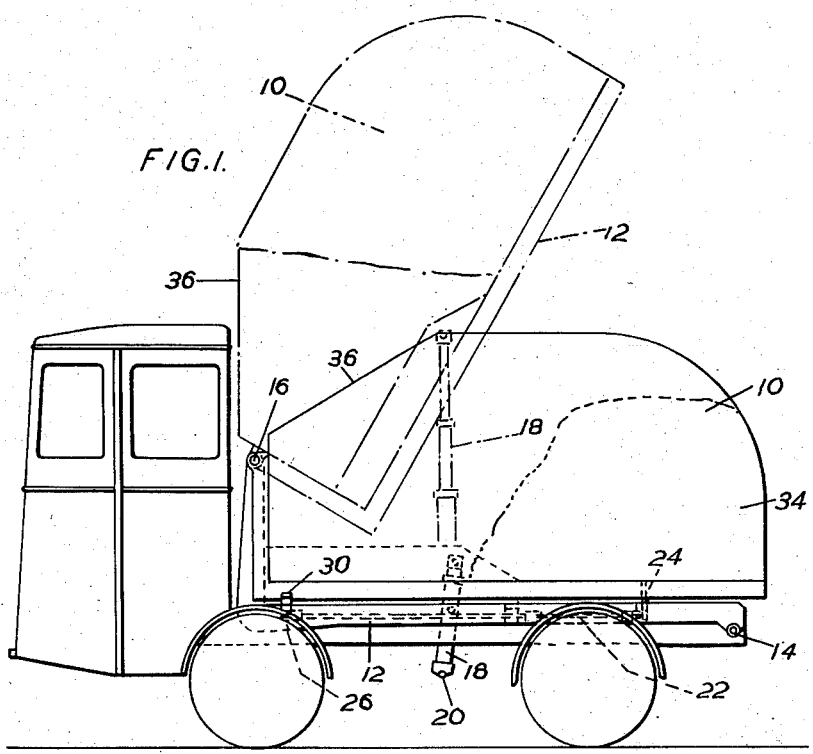
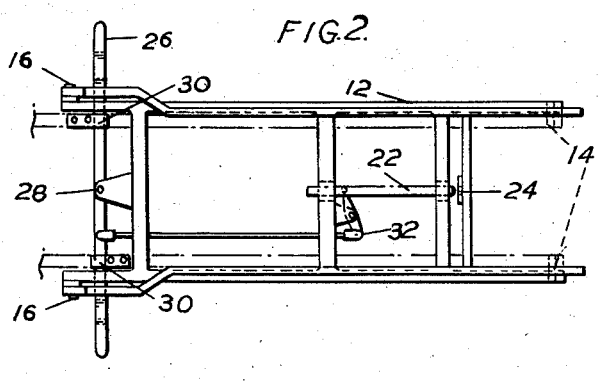

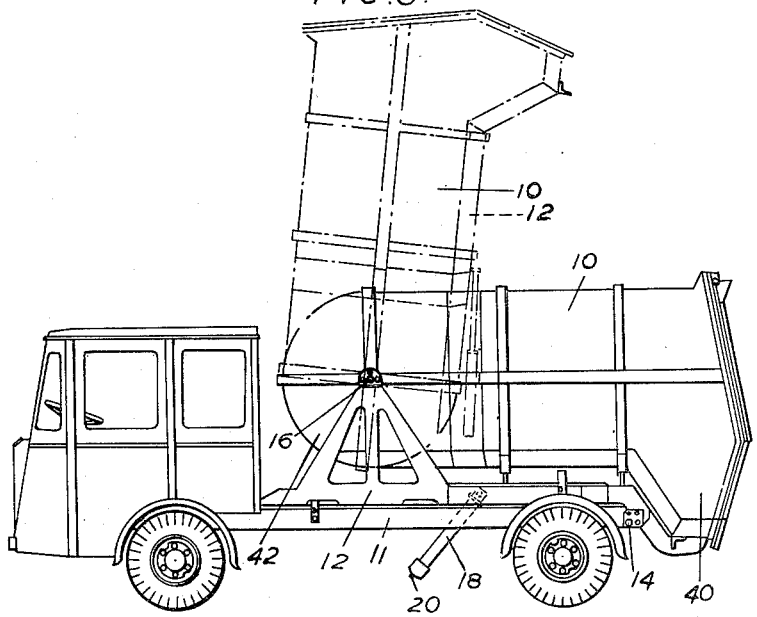
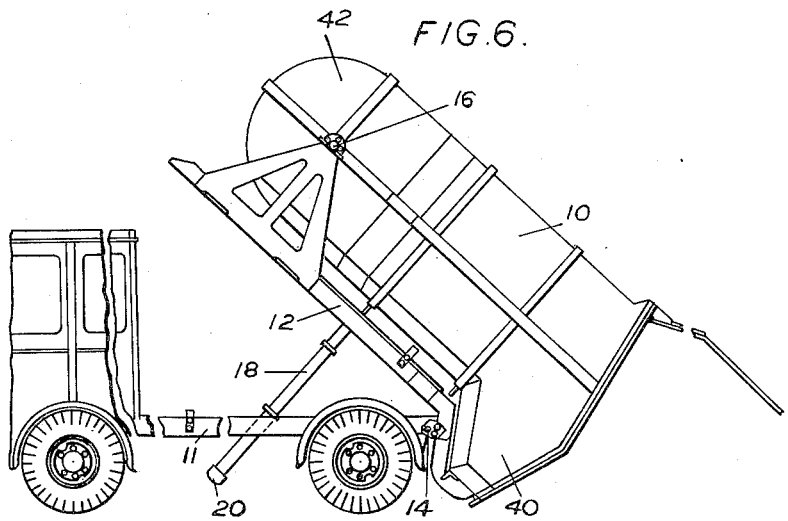

Patented Aug. 12, 1952

2,606,674

UNITED STATES PATENT OFFICE 2,606,674

REFUSE VEHICLES

Charles Kearns Edwards, Letchworth, England, assignor to Shelvoke and Drewry Limited, Letchworth, England Application August 17, 1950, Serial No. 179,988
In Great Britain May 19, 1948

14 Claims. (Cl. 214—67)

This invention relates to refuse collecting vehicles.

In order that the space available inside the body of a refuse collecting vehicle may be most economically used, it is necessary that means be provided for packing the refuse progressively towards one end of the body, generally speaking, the front end. Means of various kinds have already been provided for that purpose. Such means have been in the form of power operated pushers; moving floors are also sometimes used. Such means have proved to be quite efficient, but have the disadvantage of being expensive. A less expensive method of packing the refuse is to mount the body so that it can be tipped upwards towards the front of the vehicle.

For discharging the contents of the vehicle, it is usual to arrange for the body to be tipped upwards towards the back of the vehicle, the contents being discharged through doors at the rear end of the body which are opened for that purpose.

There have been proposals to mount the body so that it could be tipped either forwardly for refuse packing purposes, or backwardly for refuse discharge purposes, at will, the pivotal axis being selected by removal and repositioning of a hinge pin. That system has not proved to be successful in practice, because of the difficulty in providing for that accuracy of alignment of the bearings to receive the hinge pin which is necessary to ensure satisfactory operation over a long period.

The invention provides an economical solution for the problem involved, by providing on the chassis of the vehicle a sub-frame on which the body is supported. The sub-frame is pivotally connected to the chassis at one end, and to the body at the other end, and means such as a power driven ram are arranged between the chassis and the body. Further, releasable means are provided for locking the body to the sub-frame. With this arrangement when, the body being unlocked from the sub-frame, the ram is operated, the body will be tipped in one direction independently of the sub-frame; if, one the other hand, the ram is operated when the body is locked to the subframe, the body will be tipped in the other direction together with the sub-frame, the latter turning about its pivotal connection to the chassis.

The locking means can be in the form of a simple bolt carried by the sub-frame and which can be engaged when desired in suitable bearings in the body or in the chassis. It will be appreciated that such a bolt need not be a particularly accurate fit in the bearings on the body and the chassis, because it does not act as a hinge pin comparable with that used to determine the tipping axis in the proposed arrangement referred to above.

The invention leads to simplicity of construction and of operation, and to cheapness of manufacture.

Vehicles in accordance with the invention are particularly suitable for use where the refuse is loaded into the body from the rear. Such loading is essential for example, where the vehicle is to operate in very narrow streets or passages where it is not convenient to lift the refuse containing receptacles up the side of the body. It is to be understood, however, that the invention can be applied to vehicles having refuse reception openings in any part of the body.

Two examples of refuse vehicles in accordance with the invention are shown semi-diagrammatically in the accompanying drawings, in which Fig. 1 is a side elevation of the vehicle showing the body in the normal loading position and in the tipped forward position, Fig. 2 is a plan of the chassis showing the locking means in the forward tipping position, Figs. 3 and 4 are views corresponding to Figs. 1 and 2 for the tipped aft position of the body, and Figs. 5 and 6 are views corresponding respectively to Figs. 1 and 3 of a somewhat modified form of construction.

The vehicle shown in Figs. 1–4 of the drawings is an ordinary load carrier having a chassis 11 and a closed body 10 modified in accordance with the invention.

The body has a rear opening (not shown) through which refuse can be tipped into the vehicle.

The modification consists essentially in mounting the body 10 on a sub-frame 12 so that it can be tipped forward (Fig. 1) independently of the sub-frame and aft (Fig. 3) together with the sub-frame.

The sub-frame 12 is provided with a pair of vertically disposed supports or upwardly extending extensions at its front end and is provided with a permanent pivotal connection at its rear end with the rear end of the chassis at 14; the body is provided with a permanent pivotal connection with the upper ends of the vertically disposed supports or upwardly extending extensions at the front end of the sub-frame at 16.

A ram 18 operated from the engine of the vehicle through means not shown in the drawing is pivotally mounted at 20 and is arranged to act on the underside of the body 10 somewhere near the centre of the latter.

The body 10 can be locked against movement independently of the sub-frame 12 by means of a bolt 22 carried by the sub-frame and which can be slid into engagement with a hole in a bracket 24 depending from the body. The sub-frame 12 can be locked against movement independently of the chassis by means of a lever 26 pivotally mounted at 28 on the sub-frame and which can be engaged beneath holding plates 30 on the chassis. The lever 26 is connected to the bolt 22 by a linkage 32 so as to serve as the bolt operating member and to ensure that when the bolt 22 is engaged in the bracket 24, the lever 26 is disengaged from the chassis and vice versa.

When the vehicle is travelling, the sub-frame is locked to the chassis, the body being in the position shown in full lines in Fig. 1 and the bolt 22 and the lever 26 in the position shown in Fig. 2. That condition is maintained during loading which is effected at the rear of the vehicle.

When a certain amount of refuse has been collected in the vehicle as indicated at 34 in Fig. 1, the ram 18 is operated. The body is thus tipped forward about the pins 16 as shown in chain lines in Fig. 1 so that the refuse moves towards the front. A space at the rear of the body is thus cleared for the reception of further refuse. This operation can be repeated as often as is required.

When the body is filled and its load is to be dumped, the lever 26 is shifted to the position shown in Fig. 4 in which the sub-frame 12 is unlocked from the chassis and the body 10 is locked to the sub-frame. The ram 18 is then operated with the result that the body is tipped aft together with the sub-frame about the pins 14 as shown in dotted lines in Fig. 3.

The body has a door or doors (not shown) at the back through which the collected refuse can be discharged when the body is tipped aft as indicated in Fig. 3.

The simplicity of the whole arrangement will be appreciated. In particular, it will be noted that a single ram is used for tipping the body in both senses and that selection of the tipping sense involves no more than operation of the lever 26.

It is advantageous to arrange the pivot 16 as high as possible so that the cab of the vehicle does not unduly limit the tipping angle. For mechanical reasons the pivot should not be any higher than is necessary and a good compromise is shown in the drawings in which the pivot 16 is at about half the height of the cab and the body is somewhat cut-away at 36 in order to clear the cab.

As already explained, the invention is of greatest utility when applied to small refuse vehicles such as those which have to be used in narrow streets or passages. It can, however, be applied to all kinds of vehicles suitable for carrying refuse.

The form of construction shown in Figs. 1–4 is particularly suitable for relatively light vehicles. That shown in Figs. 5 and 6 is more suitable for heavier vehicles.

In Figs. 5 and 6 the same reference numerals have been used to denote parts corresponding to those of Figs. 1–4.

Here the chassis 11, as before, has a sub-frame 12 pivotally connected to it at 14 and a body 10 pivotally connected to the sub-frame at 16. The body is stepped down at the rear end as shown at 40. The front pivot 16 is arranged between the two ends of the body instead of at the extreme forward end as in Figs. 1–4. The forward end 42 of the body is semi-cylindrical.

Fig. 5 shows the body in full lines in its normal loading position and in chain lines in its tipped forward or refuse packing position. It will be noted that the body can be moved through 90°.

Fig. 6 shows the body in its tipped backwards or refuse discharging position.

A bolt and bolt operating devices similar to those 22—32 of Figs. 1–4 are provided but are not shown in Figs. 5 and 6.

A single ram 18 is shown in Figs. 5 and 6 for tipping the body. In the case of a heavy vehicle, it is generally advisable to provide two rams arranged side-by-side and acting together rather than a single ram of large diameter.

I claim:

1. A refuse collecting vehicle comprising a wheeled chassis, a sub-frame resting on said chassis, a pair of vertically disposed supports at the front of said sub-frame, a permanent pivotal connection between said chassis and said sub-frame near one end of said sub-frame, a body resting on said sub-frame, a permanent pivotal connection between said body and the upper ends of the supports on the front of said sub-frame near the end of said sub-frame opposite to said first-mentioned end, releasable means for locking said body to said sub-frame and means for applying upward pressure to said body.

2. A refuse collecting vehicle comprising a wheeled chassis, a sub-frame resting on said chassis, a pair of vertically disposed supports at the front of said sub-frame, a permanent pivotal connection between said chassis and said sub-frame near one end of said sub-frame, a body resting on said sub-frame, a permanent pivotal connection between said body and the upper ends of the supports on the front of said sub-frame near the end of said sub-frame opposite to said first-mentioned end, releasable means for locking said body to said sub-frame, releasable means for locking said sub-frame to said chassis and means for applying upward pressure to said body.

3. A refuse collecting vehicle comprising a wheeled chassis, a sub-frame resting on said chassis, a pair of vertically disposed supports at the front of said sub-frame, a permanent pivotal connection between said chassis and said sub-frame near one end of said sub-frame, a body resting on said sub-frame, a permanent pivotal connection between said body and the upper ends of the supports on the front of said sub-frame near the end of said sub-frame opposite to said first-mentioned end, means for alternatively locking said body to said sub-frame or said sub-frame to said chassis and means for applying upward pressure to said body.

4. A refuse collecting vehicle comprising a wheeled chassis, a sub-frame resting on said chassis, a pair of vertically disposed supports at the front of said sub-frame, a permanent pivotal connection between said chassis and said sub-frame near one end of said sub-frame, a body resting on said sub-frame, a permanent pivotal connection between said body and the upper ends of the supports on the front of said sub-frame near the end of said sub-frame opposite to said first-mentioned end, means for alternatively locking said body to said sub-frame or said sub-frame to said chassis, and a ram connected between said chassis and said body whereby to cause said body to tip about its pivotal connection to said sub-frame or together with said sub-frame about the pivotal connection between said sub-frame and said chassis according as said sub-frame is locked to said chassis or said body is locked to said sub-frame.

5. A refuse collecting vehicle comprising a wheeled chassis, a sub-frame resting on and having a permanent pivotal connection to the rear end of said chassis, a body resting on and having a permanent pivotal connection to the forward end of said chassis, a ram connected between said chassis and a point near the mid-point of the base of said body, a pair of bearings arranged fore-and-aft of said sub-frame, a bearing on said chassis in line with said bearings on said sub-frame, a bearing on said body in line with said bearings or said sub-frame on the side thereof remote from said bearing on said chassis, a bolt mounted in said bearings on said sub-frame, and means for moving said bolt longitudinally whereby alternatively to enter said bearing on said body or said bearing on said chassis while remaining in said bearings on said sub-frame.

6. A refuse collecting vehicle as claimed in claim 5 in which said means for moving said bolt comprise an actuating lever pivotally mounted on said sub-frame and extending transversely of the vehicle with its ends accessible one from each side of the vehicle, a lever pivotally mounted on said sub-frame and pivotally connected at one end to said bolt and a connecting rod connecting said actuating lever to the other end of said second-mentioned lever.

7. A refuse collecting vehicle comprising a wheeled chassis, a sub-frame having a base portion resting on said chassis and an upward extension rising from the front end of said sub-frame, a permanent pivotal connection between the rear end of said chassis and the rear end of said sub-frame, a body resting on said sub-frame, a permanent pivotal connection between said body and the upper end of the upward extension of said sub-frame, power driven means for applying upward pressure to said body and means for locking said body to said sub-frame whereby on actuation of said power driven means said body and said sub-frame will be turned about said pivotal connection between said chassis and said sub-frame and for unlocking said body from said sub-frame whereby on actuation of said power driven means, said body will be turned about said pivotal connection between it and said sub-frame.

8. A refuse collecting vehicle comprising a wheeled chassis, a sub-frame having a base portion resting on said chassis and an upward extension rising from each side of said sub-frame near the front end thereof, a permanent pivotal connection between the rear end of said chassis and the rear end of said sub-frame, a body resting on said sub-frame and having a substantially semi-cylindrical front end, a permanent pivotal connection between said body and the upper ends of said upward extensions of said sub-frame and having its axis substantially coincident with the axis of said semi-cylindrical front end of said body, power driven means for applying upward pressure to said body and means for locking said body to said sub-frame whereby on actuation of said power driven means said body and said sub-frame will be turned about said pivotal connection between said chassis and said sub-frame and for unlocking said body from said sub-frame whereby on actuation of said power driven means, said body will be turned about said pivotal connection between it and said sub-frame.

9. A refuse collecting vehicle comprising a wheeled chassis, a sub-frame resting on said chassis, a body resting on said chassis and extending rearwards beyond the end thereof and having a depending portion beyond said end, a permanent pivotal connection between said sub-frame and said chassis near the rear end of said sub-frame and at a level lower than that of the part of the chassis on which said sub-frame rests, a permanent pivotal connection between said body and said sub-frame near the end of said sub-frame opposite to said first mentioned end, releasable means for locking said body to said sub-frame and means for applying upward pressure to said body at a point between said pivotal connections.

10. A refuse collecting vehicle comprising a wheeled chassis, a sub-frame resting on said chassis, a pair of vertically disposed supports on the front end of said sub-frame, a pivotal connection between the rear end of said chassis and said sub-frame near the rear end of said sub-frame, a body resting on said sub-frame, a pivotal connection between said body and the upper ends of the supports on said sub-frame at the rear end of said sub-frame opposite to said first-mentioned end, releasable means for locking said body to said sub-frame and means for applying upward pressure to said body.

11. A refuse collecting vehicle comprising a wheeled chassis, a sub-frame resting on said chassis, a pair of vertically disposed supports on the front end of said sub-frame, a pivotal connection between the rear end of said chassis and said sub-frame near the rear end of said sub-frame, a body resting on said sub-frame, a pivotal connection between said body and the upper ends of the supports on said sub-frame at the rear end of said sub-frame opposite to said first-mentioned end, releasable means for locking said body to said sub-frame, releasable means for locking said sub-frame to said chassis and means for applying upward pressure to said body.

12. A refuse collecting vehicle comprising a wheeled chassis, a sub-frame resting on said chassis, a pair of vertically disposed supports on the front end of said sub-frame, a pivotal connection between the rear end of said chassis and said sub-frame near the rear end of said sub-frame, a body resting on said sub-frame, a pivotal connection between said body and the upper ends of the supports on said sub-frame at the rear end of said sub-frame opposite to said first-mentioned end, means for alternatively locking said body to said sub-frame or said sub-frame to said chassis and means for applying upward pressure to said body.

13. A refuse collecting vehicle comprising a wheeled chassis, a sub-frame resting on said chassis, a pair of vertically disposed supports on the front end of said sub-frame, a pivotal connection between the rear end of said chassis and said sub-frame near the rear end of said sub-frame, a body resting on said sub-frame, a pivotal connection between said body and the upper ends of the supports on said sub-frame at the rear end of said sub-frame opposite to said first-mentioned end, means for alternatively locking said body to said sub-frame or said sub-frame to said chassis, and a ram connected between said chassis and said body whereby to cause said body to tip about its pivotal connection to said sub-frame or together with said sub-frame about the pivotal connection between said sub-frame and said chassis according as said sub-frame is locked to said chassis or said body is locked to said sub-frame.

14. A refuse collecting vehicle comprising a wheeled chassis, a sub-frame resting on and pivotally connected to the rear end of said chassis, a pair of vertically disposed supports on the front end of said sub-frame, a body resting on said chassis and pivotally connected to the upper ends of the supports on the forward end of said chassis, a ram connected between said chassis and a point near the mid-point of the base of said body, a pair of bearings arranged fore-and-aft of said sub-frame, a bearing on said chassis in line with said bearings on said sub-frame, a bearing on said body in line with said bearings or said sub-frame on the side thereof remote from said bearing on said chassis, a bolt mounted in said bearings on said sub-frame, and means for moving said bolt longitudinally whereby alternatively to enter said bearing on said body or said bearing on said chassis while remaining in said bearings on said sub-frame.

CHARLES KEARNS EDWARDS.

REFERENCES CITED

The following references are of record in the file of this patent:

UNITED STATES PATENTS

| Number | Name | Date |
|---|---|---|
| 1,697,364 | McCollum et al. | Jan. 1, 1929 |
| 1,781,346 | Schmidt | Nov. 11, 1930 |
| 1,985,169 | Howell et al. | Dec. 18, 1934 |
| 2,019,451 | Harm | Oct. 29, 1935 |
| 2,123,505 | Faries | July 12, 1938 |

FOREIGN PATENTS

| Number | Country | Date |
|---|---|---|
| 378,234 | Great Britain | Aug. 11, 1932 |
| 754,652 | France | Aug. 28, 1933 |
| 50,510 | Holland | May 16, 1941 |